US012661625B2

(12) United States Patent
Epstein et al.

(10) Patent No.: US 12,661,625 B2
(45) Date of Patent: Jun. 23, 2026

(54) PROCESS AND APPARATUS FOR SEPARATION, REMOVAL, AND PURIFICATION OF SOLID CARBON OUTCOMING FROM A HYDROGEN PRODUCTION REACTOR BY METHANE AND/OR HYDROCARBONS CRACKING WITH LOW CO$_2$ EMISSIONS

(71) Applicant: NEXTCHEM S.p.A., Rome (IT)

(72) Inventors: Michael Epstein, Rishon LeZion (IL);
Gaetano Iaquaniello, Rome (IT);
Salvatore Romagnuolo, Rome (IT);
Emma Palo, Battipaglia (IT)

(73) Assignee: KT TECH S.P.A., Rome (IT)

( * ) Notice: Subject to any disclaimer, the term of this patent is extended or adjusted under 35 U.S.C. 154(b) by 550 days.

(21) Appl. No.: 18/348,941

(22) Filed: Jul. 7, 2023

(65) Prior Publication Data

US 2024/0009642 A1 Jan. 11, 2024

(30) Foreign Application Priority Data

Jul. 8, 2022 (IT) ......................... 102022000014503

(51) Int. Cl.
*B01J 10/00* (2006.01)
*B01J 8/00* (2006.01)
(Continued)

(52) U.S. Cl.
CPC ............. *B01J 10/005* (2013.01); *B01J 8/005* (2013.01); *B01J 8/0085* (2013.01);
(Continued)

(58) Field of Classification Search
CPC ........ B01J 8/0055; B01J 10/005; B01J 8/006; B01J 35/27; B01J 2208/00938;
(Continued)

(56) References Cited

U.S. PATENT DOCUMENTS 2,768,935 A * 10/1956 Watkins ................... C10G 9/40
208/405
5,962,537 A * 10/1999 Leviness ................ C07C 1/066
518/706
(Continued)

FOREIGN PATENT DOCUMENTS

CN 204369629 U * 6/2015
CN 108607487 A * 10/2018 ............ B01J 19/123
(Continued)

OTHER PUBLICATIONS

A. Abanades et al., "Development of Methane Decarbonisation Based on Liquid Metal Technology for CO2-FREE Production of Hydrogen", International Journal of Hydrogen Energy, vol. 41, No. 19, May 25, 2016, pp. 8159-8167.
(Continued)

*Primary Examiner* — Imran Akram
(74) *Attorney, Agent, or Firm* — NIXON & VANDERHYE

(57) ABSTRACT

The present invention is an apparatus and method for continuously separating, removing and purifying the solid residue, resulting from the conversion of hydrocarbons into carbon and hydrogen, from the homogeneous phase of different density contained in a cracking reactor with which said solid residue is not soluble, and where the separation of the solid carbon occur at two subsequent moments: a first separation occurs inside the reactor between the reaction products, including carbon, and the melting bath; a second separation then occurs outside the reactor between the carbon and the gas produced in a separation system (1) of the solid phase from the gas phase, where said separation system (1) also includes carbon purification.

30 Claims, 9 Drawing Sheets

(51) Int. Cl.
    *B01J 19/00*          (2006.01)
    *B01J 19/18*          (2006.01)
    *C10G 1/04*          (2006.01)

(52) U.S. Cl.
    CPC .......... *B01J 19/0066* (2013.01); *C10G 1/045*
        (2013.01); *B01J 19/1875* (2013.01); *C01B*
        *2203/049* (2013.01); *C01B 2210/0009*
        (2013.01)

(58) Field of Classification Search
    CPC ................... B01J 8/0065; B01J 19/006; B01J
        2208/00902; B01J 2208/00929; B01J
        19/0066; C10G 49/22; C10G 1/045
    See application file for complete search history.

(56)           References Cited

U.S. PATENT DOCUMENTS

| | | | |
|---|---|---|---|
| 6,110,239 | A | 8/2000 | Malone et al. |
| 10,851,307 | B2 | 12/2020 | Desai |
| 2004/0253168 | A1 | 12/2004 | Chu |
| 2006/0231466 | A1* | 10/2006 | Nuber ..................... F27B 15/02 |
| | | | 209/11 |
| 2016/0075827 | A1* | 3/2016 | Welch ................... B01J 19/006 |
| | | | 528/335 |

| | | | |
|---|---|---|---|
| 2016/0136732 | A1* | 5/2016 | Komatsu ................ B22F 1/056 |
| | | | 75/370 |
| 2016/0369192 | A1* | 12/2016 | Streitenberger ........... C10J 3/60 |
| 2018/0216012 | A1* | 8/2018 | Marchant .............. B01J 8/0065 |
| 2020/0283293 | A1 | 9/2020 | Mcfarland et al. |
| 2021/0077970 | A1* | 3/2021 | Begue .................. B01J 19/0053 |
| 2021/0079125 | A1* | 3/2021 | Trapp ........................ C08F 2/01 |
| 2022/0119259 | A1 | 4/2022 | Goetheer et al. |
| 2022/0332579 | A1* | 10/2022 | Ma ....................... B01J 19/0066 |
| 2023/0061539 | A1* | 3/2023 | Price .......................... C08F 2/01 |
| 2023/0330612 | A1* | 10/2023 | Chaise .................. B01J 8/0214 |
| 2024/0181416 | A1* | 6/2024 | Gnanasekaran ....... B01J 8/0496 |

FOREIGN PATENT DOCUMENTS

| | | | | |
|---|---|---|---|---|
| JP | 2009161426 A | * | 7/2009 | .......... C01B 32/162 |
| WO | 2019099795 A1 | | 5/2019 | |
| WO | 2020046583 A1 | | 3/2020 | |
| WO | WO-2022069816 A1 | * | 4/2022 | .............. B01J 8/065 |

OTHER PUBLICATIONS

Italy Search Report for IT202200014503 completed Feb. 27, 2023, 9 pages.

* cited by examiner

SEZ. A-A'

SEZ. B-B'

PROCESS AND APPARATUS FOR SEPARATION, REMOVAL, AND PURIFICATION OF SOLID CARBON OUTCOMING FROM A HYDROGEN PRODUCTION REACTOR BY METHANE AND/OR HYDROCARBONS CRACKING WITH LOW CO₂ EMISSIONS

CROSS-REFERENCE TO RELATED APPLICATION

This application claims priority to IT 102022000014503 filed Jul. 8, 2022, the entire contents of which are hereby incorporated by reference.

SUMMARY OF THE INVENTION

The present invention relates to an apparatus and method for separating, continuously removing from a reactor (R), and purifying an insoluble solid residue with a homogeneous phase of different density contained in the same reactor.

FIELD OF THE INVENTION

The field of application is the separation, removal of the solid residue from a reactor loop, i.e., a cracking reactor for the conversion of hydrocarbons into hydrogen and carbon, and the purification of the solid residue produced inside the reactor where said reaction occurs in a melting bath consisting of metals and/or molten salts.

BACKGROUND ART

It is known that the conversion of natural gas or other hydrocarbons into $H_2$ and solid carbon can be a viable alternative to the electrolysis of water using renewable electricity, due to the high production costs of electrolysis. These costs largely stem from the need to break the O—H bond which is particularly strong as compared to the C—H bond.

From this point of view, cracking natural gas inside a molten medium, for example in a molten metal and/or molten salt in the presence or absence of a catalyst, is an option and a very interesting alternative for producing $H_2$ without $CO_2$ emissions.

As known, the cracking reaction of methane (1) is sufficiently endothermic, as shown by the following reaction:

$$CH_{4(g)} = C_{(s)} + 2H_{2(g)} \Delta H = 74 \text{ kJ/mol} \quad (1)$$

However, methane cracking is only one example of the simplest case of a wide range of saturated hydrocarbons which can be cleaved by breaking the C—H bond.

$$C_nH_{2n+n} = nC_{(s)} + (n+1)H_2 \quad (2)$$

The removal of solid carbon from inside the reactor is one of the main difficulties in using $CH_4$ cracking technology in molten metal and/or molten salt reactors, in particular when operating conditions are to be achieved where the reactor operates at a pressure of 10-20 barg, also in view of the fact that solid carbon tends to adsorb gases, albeit in minimal amounts, in particular hydrocarbons.

The importance of this removal is dictated by the fact that 70-80% by weight of the feed leaves the reactor in the form of solid coal having a relatively dusty and poorly compacted structure (see FIG. 4) at the reactor temperature, i.e., between 800 and 1200 degrees centigrade.

Some application examples of removing solid coal from a cracking reactor in the presence of a molten medium are given below.

In order to facilitate the removal of coal from the molten bath, patent WO 2019/099795 A1, "Simultaneous reactions and Separation of chemicals", discloses the use of a molten liquid salt above the bath in which the solid coal is concentrated.

This layer then passes into a separate chamber from the reactor where the coal is mechanically separated and the molten salt, used to extract the solid, returns to the reactor.

In this patent, the coal collection zone is in the annular part of the reactor due to the different density between the central zone, where the charge is injected and bubbling is carried out, and the lateral torus where there are molten metal and salts.

In the text of the patent, there are no indications on the operating pressure of the reactor.

Patent WO 2020/046583 A1, "Systems and processes for molten media pyrolysis", again relates to the concept of the "reactor loop", but "seed particles" are introduced to facilitate the separation of the solid fraction, with the aim of increasing the average size of the coal particles, and alternatively or jointly operating methods are indicated, which are adapted to increase the residence time and therefore the particle size of the coal particles.

On the other hand, no specific indication is given on the solid extraction methods aside from having the option of installing "screw feeders".

In U.S. Pat. No. 10,851,307 B2, "System and method for pyrolysis using a liquid metal catalyst", the morphological features of the solid coal are put in relation to the type of catalyst used, the separation of the coal is done in a separate container, although scrapers or stirrers as well as gas jets can be included in the main reactor for removing the solid.

In the claims, however, no reference is made to the solid removal methods.

US patent US 2004/0253168 A1, "System and method for hydrocarbon processing", relates to the production of nano-structured coal and hydrogen in a "spouted bed" type reactor and the coal removal occurs by means of a sleeve filter which processes the gas/solid mixture and recovers the solid which is then removed when the system is stopped and thus plays on the discontinuous operation thereof.

In the study to Abánades et al. "*Development of methane decarbonisation based on liquid metal technology for CO₂-free production of hydrogen*", Int. J. Energia idrogeno 2016, 41, 8150-8167, there are provided a reactor containing liquid metal, a subsequent step of separating carbon from liquid metal, a step of separating carbon from gas, a step of separating hydrogen from gas, and then a recycling of the unreacted raw material (methane) to the reactor; but how to perform such separation steps is not specifically indicated.

Therefore, as can be seen from the cited documents, the removal of solid coal is a critical step of the natural gas cracking process: such a step is strictly dependent on a multiplicity of factors, among which the following can be mentioned: the considerable amount of solid to be removed, the adsorption of the gases, which therefore implies a continuous process, the fact that the reactor operates at high pressure, generally between 10 and 20 barg and, lastly, the morphological features of the coal to be removed.

In fact, in this type of process, the average carbon size can range from a few tens of microns, see FIG. 4, to a few hundred microns.

Moreover, the amount and features of such coal make such a removal from the cracking reactor particularly difficult, especially in a commercial context which has the need to operate continuously and thus avoiding having to stop the production to remove the solid.

U.S. Pat. No. 6,110,239 A describes a process in which a high-pressure hydrogen-rich gas stream with high purity and a high-pressure carbon monoxide-rich gas stream are produced simultaneously, separately and continuously, using a molten metal gasifier containing at least two zones, thus avoiding the need to separate or compress the gases in downstream equipment.

In essence, the hydrocarbons are cleaved in the first chamber with the separation of the hydrogen from the molten mass in which the coal is trapped; the molten mass is then sent to the second zone in which oxygen is bubbled so as to promote the formation of carbon monoxide.

Patent US 2022/119259 A instead describes a method for the pyrolysis of hydrocarbons in a molten metal to produce hydrogen gas and carbon, in which a liquid salt immiscible with the molten metal is used to separate the carbon, obtained by pyrolysis, from the molten metal.

Therefore, the molten salt introduced facilitates both the separation from the melting bath and the isolation of the carbon produced.

TASK OF THE INVENTION

It is the task of the present invention to overcome the limits of the background art, providing an apparatus capable of continuously removing the solid coal, produced in the reactor, from both the molten metal and/or molten salts and the gaseous stream, while allowing it to be cooled so as to be easily transported, maintaining the operating pressure and minimizing the content of methane and $H_2$ adsorbed on the solid.

SUGGESTED SOLUTION

The suggested solution is to utilize the non-solubility of the solid with the homogeneous phase of different density present in the reactor to promote a layering and an accumulation of said solid inside the reactor and thus to use the gas stream released by the reactor as a carrier for the transport of the same solid towards an external treatment circuit, so as to separate the gas from the solid in said external circuit, desorbing any retained fractions and continuously removing the solid.

LIST OF FIGURES

A better understanding of the invention will be achieved from the following detailed description and with reference to the accompanying drawings showing, by way of a non-limiting example, a preferred embodiment.

DETAILED DESCRIPTION OF THE INVENTION

Figure 1:
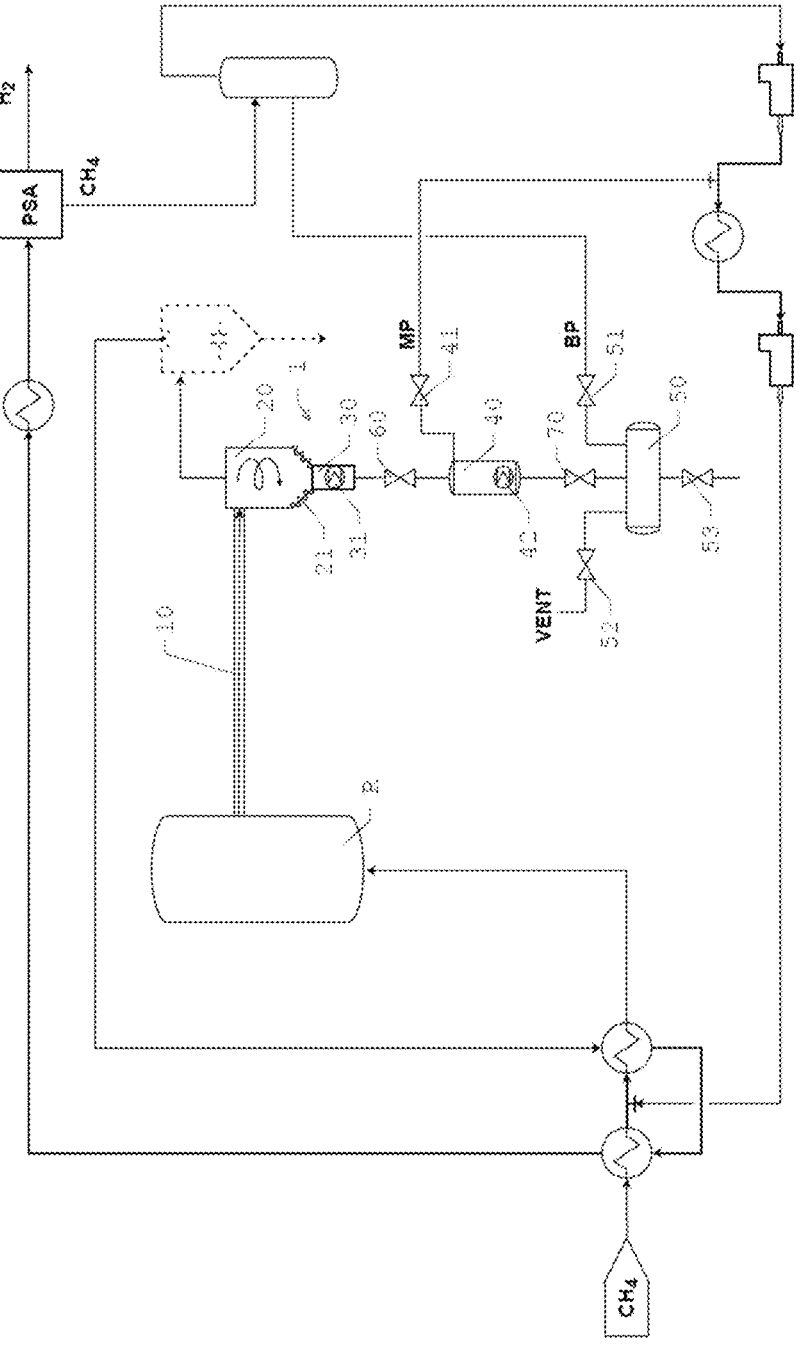
FIG. 1 shows a conceptual diagram of the method where the separation system outside the reactor can be seen.
Figure 2A:
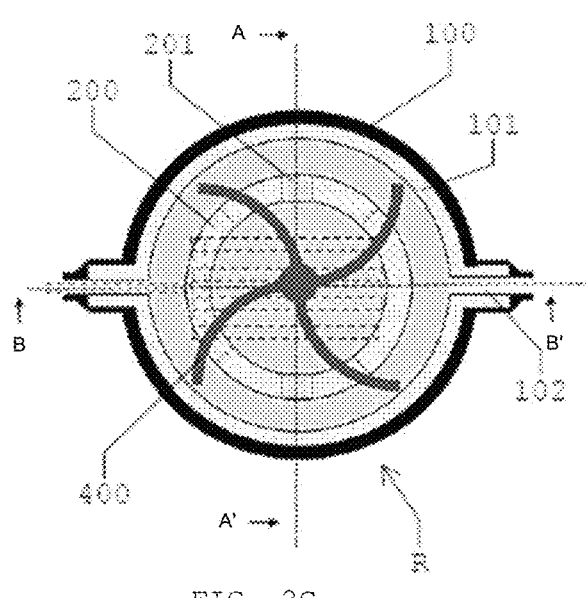
FIG. 2A shows a plan section view of the reactor R according to the invention.
Figure 2B:
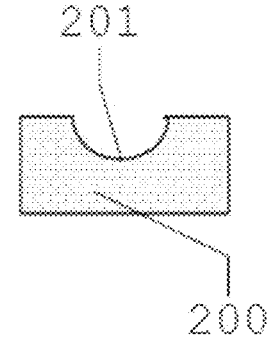
FIG. 2B shows a detail of the barrier 200 and the weir 201 present inside the reactor R.
Figure 2C:
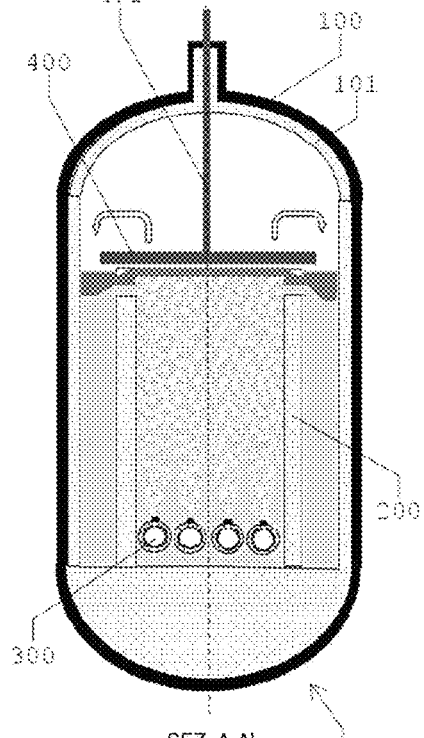
FIGS. 2C and 2D show two vertical section views according to two different planes of the reactor R according to the invention.
Figure 2D:
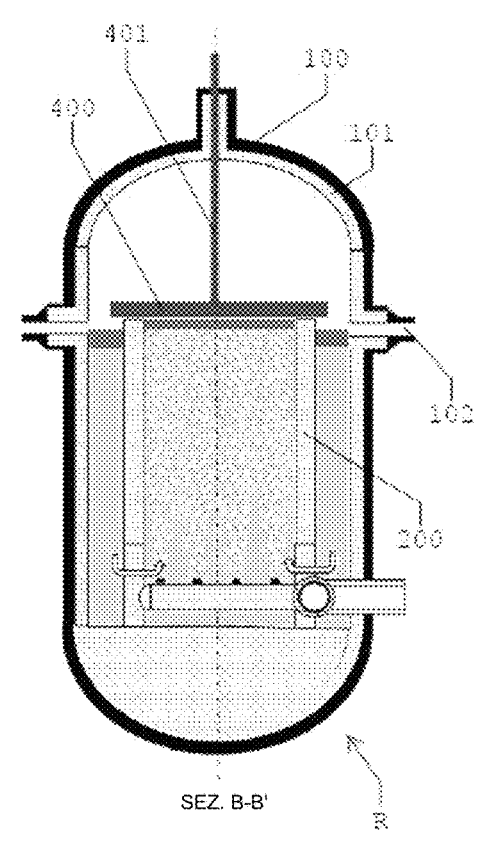
Figure 3A:
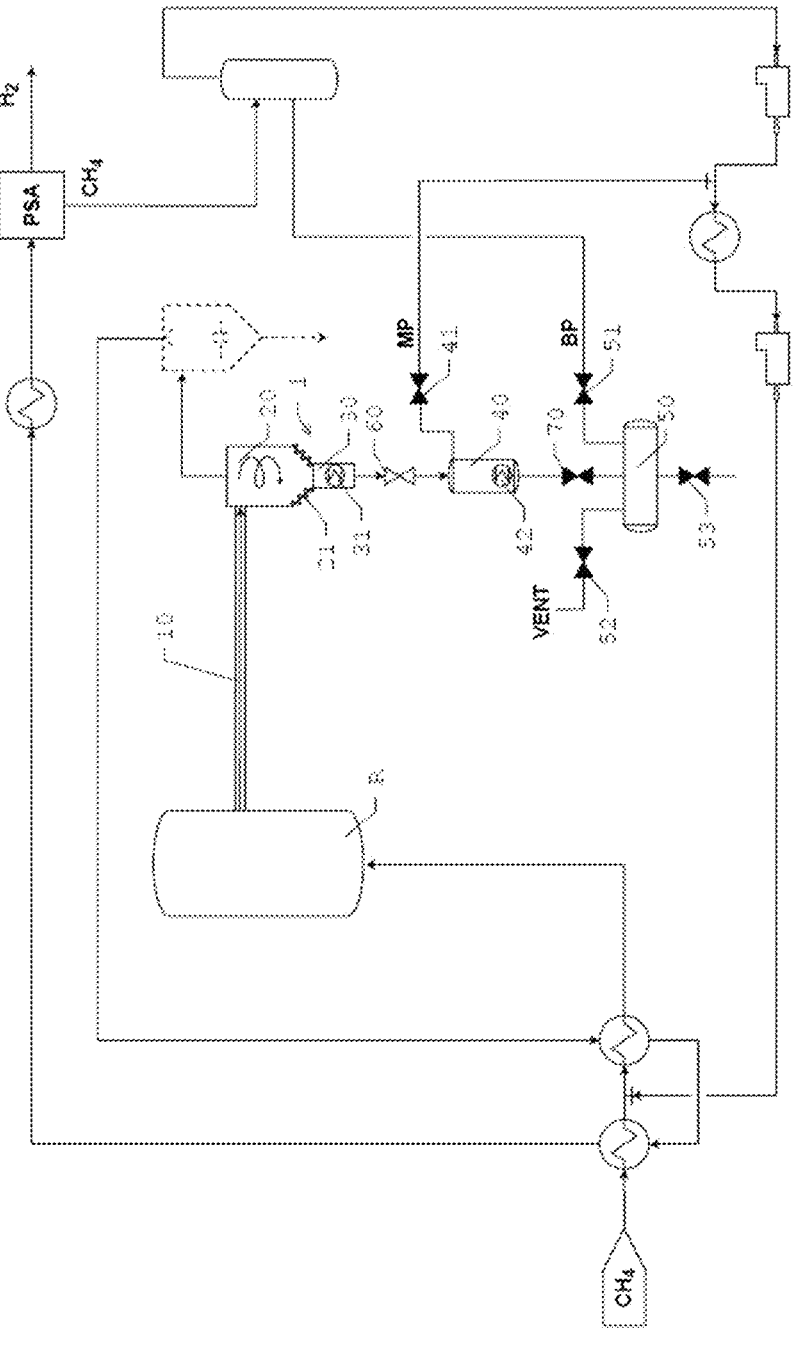
FIGS. 3A, 3B, 3C, 3D, 3E, 3F show the steps related to the discharge sequence according to the invention.
Figure 3B:
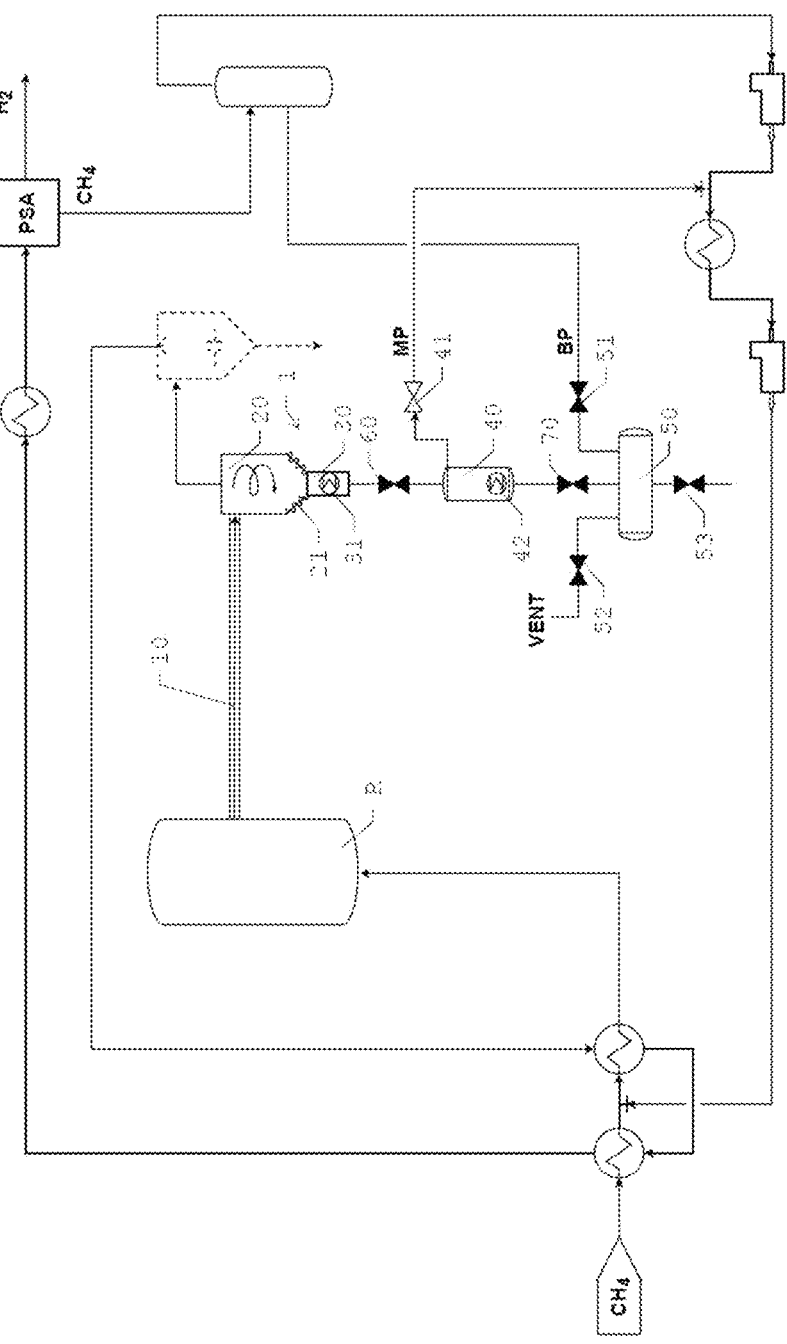
Figure 3C:
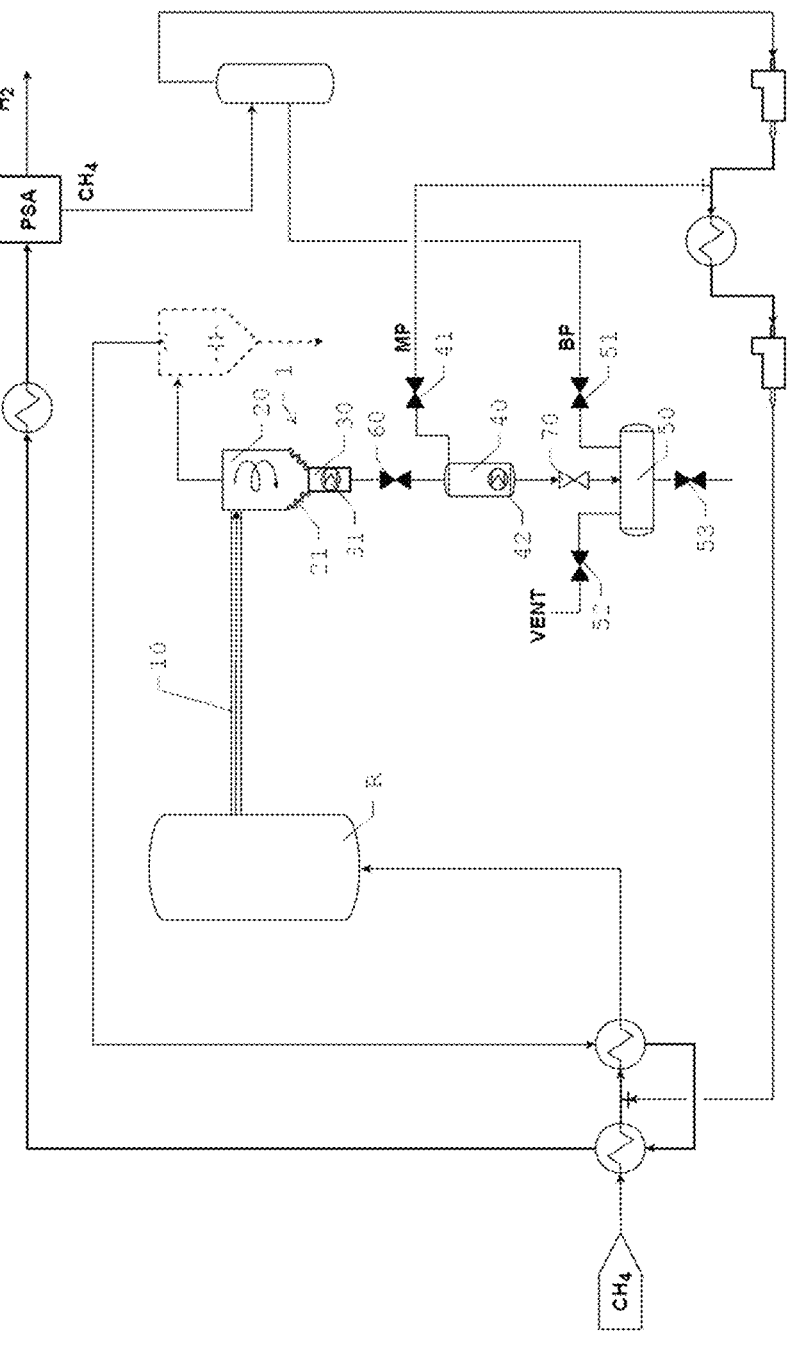
Figure 3D:
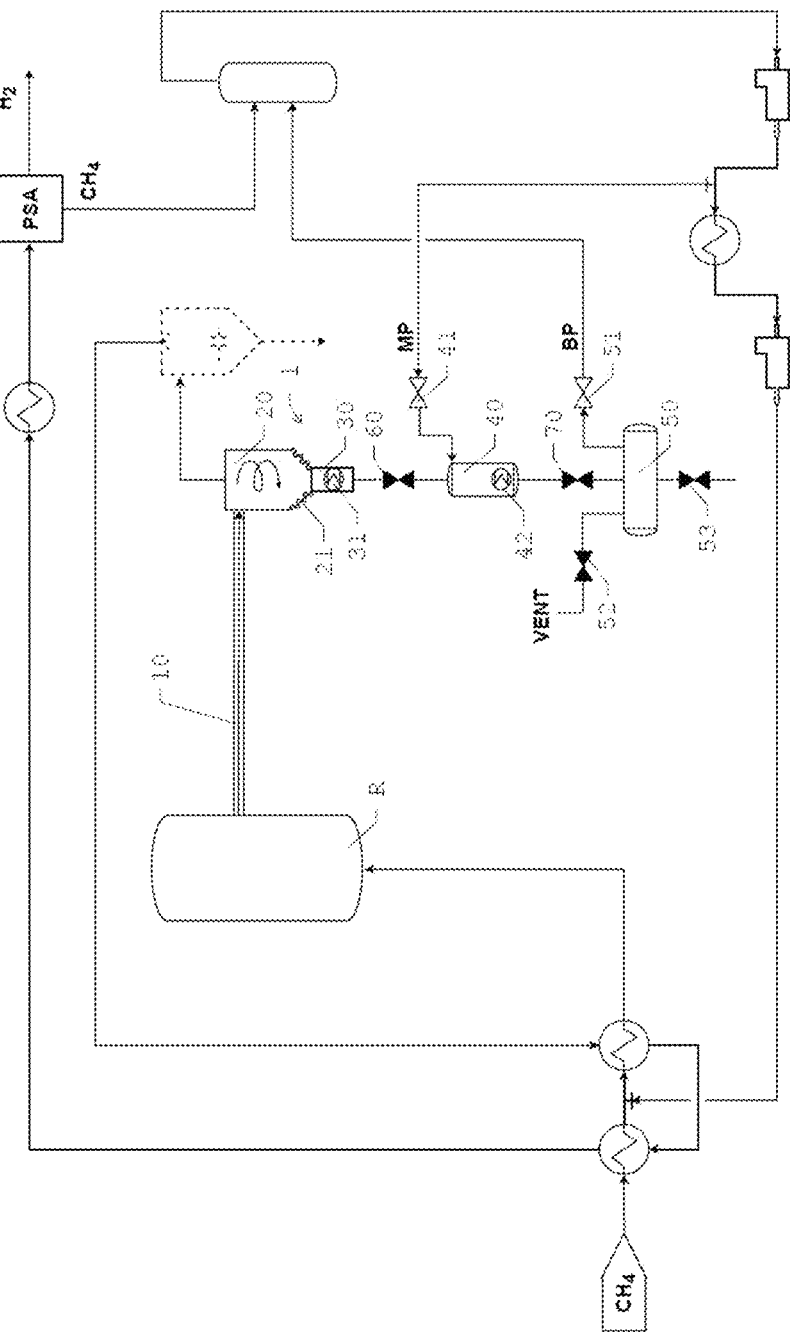
Figure 3E:
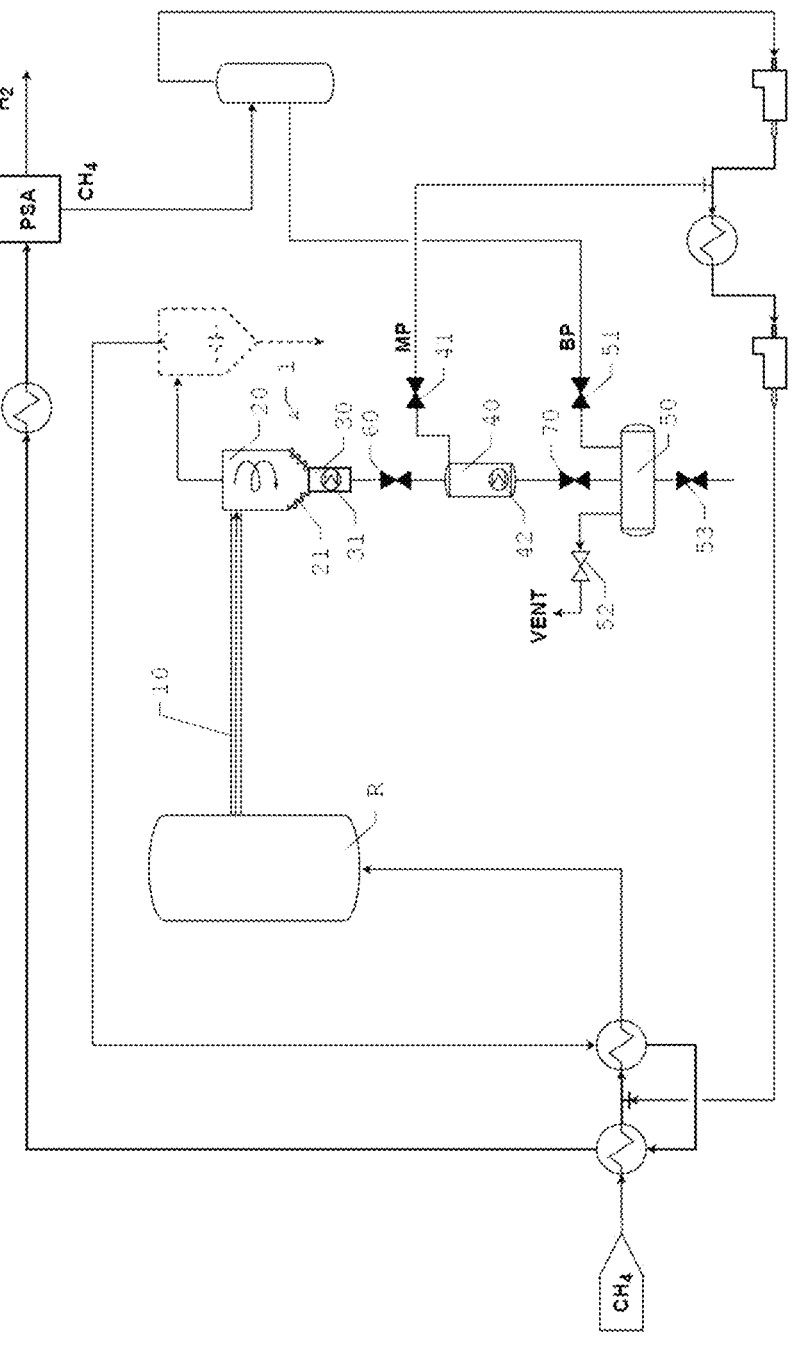
Figure 3F:
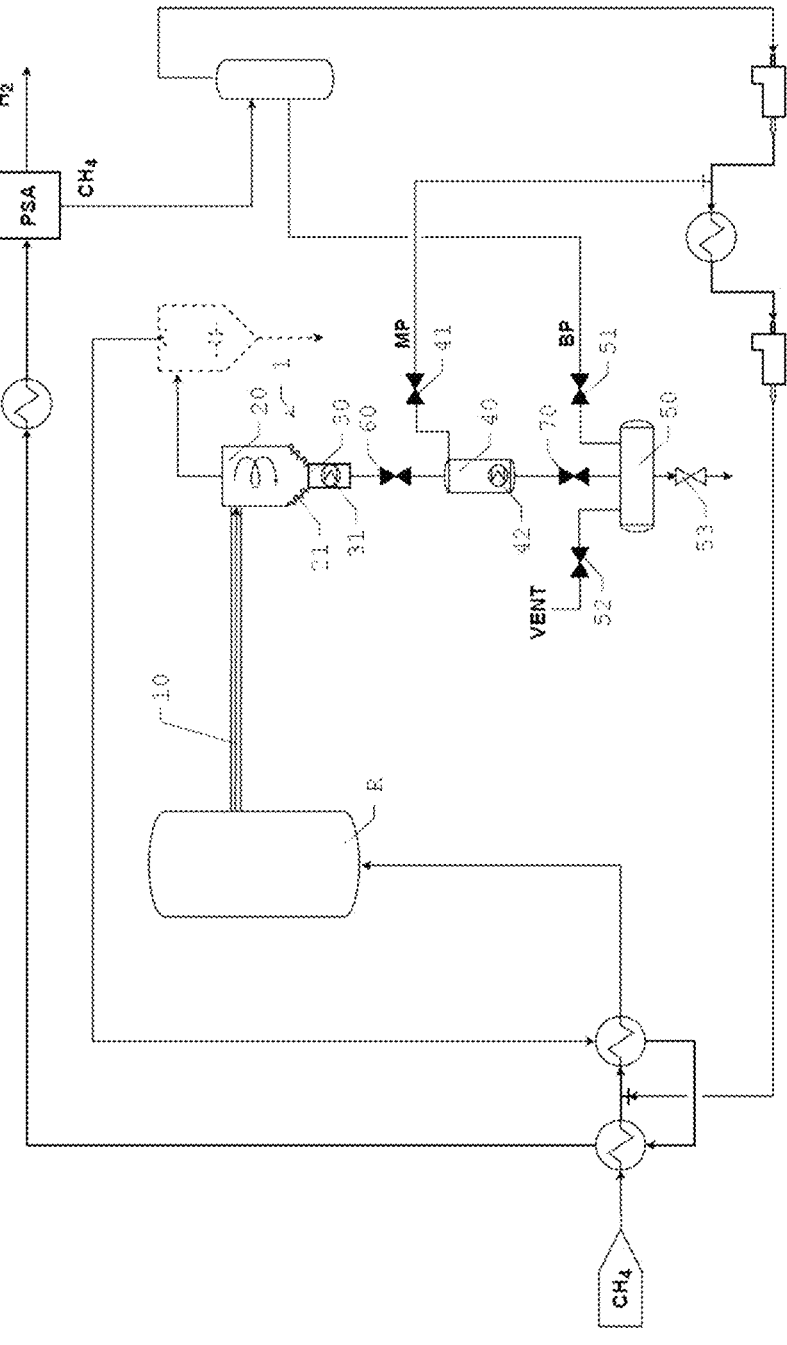
Figure 4:
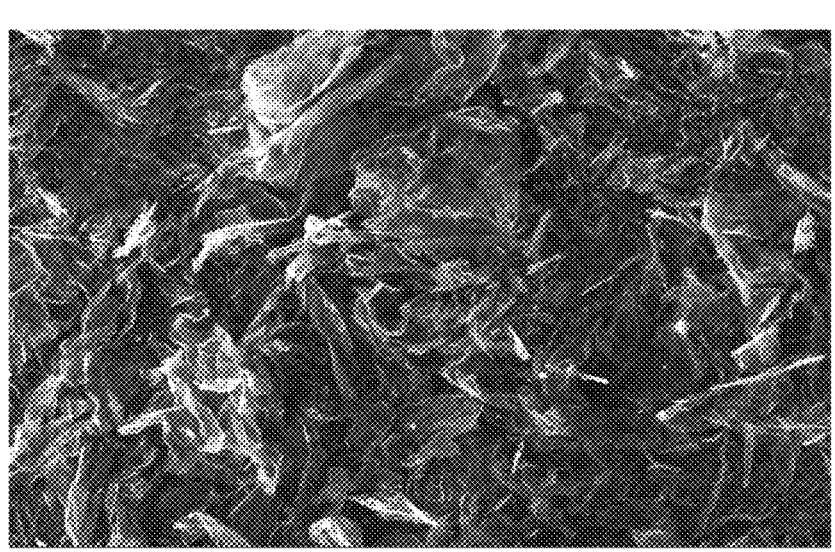
FIG. 4 shows some pictures of the solid coal obtained at a temperature of about 1000° C.

With reference to the accompanying figures, the reactor R is a cracking reactor for the conversion of hydrocarbons into hydrogen (gas) and carbon (solid).

In the preferred embodiment described, said reactor R is of the recirculation type, or loop reactor, in which a medium consisting of a bath of molten metal and/or molten salt is present, in the presence or absence of a catalyst, with which the solid carbon, produced during the reaction, is insoluble.

According to the present invention, the separation of the solid carbon occurs in two subsequent moments:

Firstly, a first separation occurs inside the reactor between the reaction products, including carbon, and the melting bath;

A second separation then occurs outside the reactor between the carbon and the produced gas.

While the first separation between the reaction products and the melting bath occurs continuously inside the reactor, the second separation between the various reaction products occurs discontinuously, given the tendency of carbon to absorb part of the produced gases.

So as to overcome these problems, a system has been developed, which allows continuous operation and removal of the carbon produced by the reactor R, optimizing the various separation steps and minimizing the adsorption of the gases in the solid carbon.

According to the present invention, the carbon separation, removal and purification system 1 comprises the following elements:

At least one reactor R provided with a barrier 200 and means for introducing the hydrocarbon into the reactor;

At least one exit pipe 10 for connecting the purification system 1 with said reactor R;

and where said purification system 1 comprises:

at least one primary separator 20;

at least one collection chamber 30 of the solid carbon from the primary separator 20;

at least one intermediate transfer tank 40 provided with a vent valve connected to the medium pressure circuit, or MP vent valve 41;

at least one final storage tank 50 provided with a vent valve connected to the low pressure circuit, or BP vent valve 51, a second atmospheric vent valve, or ATM vent valve 52 and a bottom valve 53 for discharging coal;

at least one primary valve 60 placed between the collection chamber 30 and the intermediate tank 40 for transferring carbon from said collection chamber to the intermediate tank;

at least one secondary valve 70 placed between the intermediate tank 40 and the storage tank 50 for transferring carbon from the intermediate tank to the storage tank;

a control and automation system for opening the valves by means of PLC.

In essence, the invention includes that, after the cracking reaction, where the hydrocarbon introduced into the reactor is converted into $H_2$ and carbon, a separation occurs inside the reactor between the molten mass, forming the melting bath, and the gaseous and solid fractions.

The stream consisting of the gas and solid is then removed from the reactor.

Following this removal from the reactor, the coal purification step occurs, i.e., the separation of the gas from the solid so as to avoid adsorption of the gas inside the produced coal.

Reactor R

As mentioned, the hydrocarbon cracking reaction occurs inside a molten medium, such as a molten metal and/or molten salt in the presence or absence of a catalyst, in a reactor R of the recirculation type.

According to the invention, the reactor R comprises the following elements:

A shell 100, possibly internally coated with refractory material 101 on which at least one outlet nozzle 102 is obtained in order to facilitate the release of the gas/solid stream produced inside said reactor;

A barrier 200 of hollow cylindrical shape, made of refractory material, coaxial with the shell 100 of the reactor; said barrier being provided with at least one weir 201 at the top and with at least one opening at the bottom to allow both the installation of said barrier 200 above the hydrocarbon distribution zone and the passage of molten metal from the annular zone towards the inner zone;

At least one distributor 300 placed at the bottom of the reactor R for the injection of hydrocarbon into the reactor;

An impeller 400, or scraper, operated by a shaft 401 driven by a motor placed outside the reactor.

The cylindrical volume inside said barrier 200 is the reaction zone, while the volume between the shell 100 of the reactor R and the outer surface of said barrier 200 is the calm zone.

In practice, the calm zone is the annular section placed between the shell 100 and the barrier 200.

Following the introduction of hydrocarbons into the reactor and the cracking reaction, a mass will be obtained in the reaction zone consisting of a gaseous phase (reaction products and unreacted hydrocarbons), a solid carbon phase contained in the melting bath.

Therefore, the melting bath has two different densities inside the reactor: in the reaction zone, said melting bath will have a lower density due to the bubbling therein of the hydrocarbons introduced into the reactor through the distributor 300, while said melting bath will have a higher density in the calm annular zone due to both the separation of the products from the molten mass and the local cooling due to the distance from the reaction zone.

This difference in density causes a stirring motion of the molten mass between the reaction zone and the calm zone.

According to the invention, the passage of the molten metal from the reaction zone to the calm zone occurs due to the density difference existing in the two zones and through one or more special openings, or weirs 201, present in said barrier 200, allowing the collection, by dragging, of most of the solid carbon produced in the annular zone.

The insolubility of the carbon, produced during the reaction, with the liquid metal phase, causes a layering of the same carbon on the free surface of the melting bath, at the calm annular zone, while the produced gas naturally separates from the molten mass, accumulating in the upper part of the reactor.

The movement of the coal mainly occurs due to the intrinsic geometry of the reactor, where the density difference between the central reaction zone and the lateral calm one creates a level difference, which promotes the recirculation of the molten medium and pushes the coal from the center towards the periphery through one or more cavities located close to the one or more discharge zones.

In addition, the presence of a scraper 400, driven by a shaft 401, for example driven by an external magnetic coupling motor, allows improving the movement of the solid accumulated on the free surface from the central zone towards the annular zone.

In the non-limiting preferred embodiment described, the scraper 400 has a diameter greater than that of the barrier and smaller than that of the shell so as to allow avoiding coal accumulations above the barrier itself.

After being transported from the melting bath outside the central reaction zone beyond the barrier 200 by means of the weir 201, the coal is moved by flotation from the same melting bath from the discharge point at the weir 201 towards the outlet nozzle (102) from the reactor.

In the non-limiting, preferred embodiment described, the reactor outlet nozzle (102) is angularly offset with respect to the discharge point of the weir 201.

This allows promoting a further separation of the reaction products from the melting bath, during the path from the discharge point of the weir 201 towards the outlet nozzle 102.

Exit Pipe 10

Said annular zone is connected to at least one exit pipe 10 so as to allow the discharge of the solid by utilizing the release of the gas from the cracking reactor, the upper level of which is placed above the free surface of the molten metal under all operating conditions.

In practice, the carbon produced and accumulated in the calm annular zone is dragged out by the gaseous stream of hydrogen produced inside the reactor, which then acts as a carrier for the removal thereof.

The exit pipe 10 can be made either of refractory or metal material depending on the temperature reached by the chamber.

In a preferred, but non-limiting embodiment, said pipe 10 is cooled so as to reduce the temperature of the stream consisting of gas and solid from the existing value inside the reactor, and equal to about 1000-1200° C., to a value equal to about 800-900° C.

Primary Separator 20

There is at least one primary separator 20 downstream of the exit pipe 10.

In the non-limiting, preferred embodiment described, the primary separator 20 is a cyclone operating under the same pressure conditions as the reactor and allowing a first separation between the gas.

Optionally, the primary separator 20 can be provided with a cooling system.

The upper part of the primary separator 20, from which the gas separated from the solid, mainly consisting of hydrogen and methane, flows, is in turn connected to a manifold which directs said gas to a subsequent purification unit, after any thermal recovery with preheating of the hydrocarbon stream entering in the reactor.

The gaseous stream exiting from the primary separator 20 and consisting of hydrogen and methane, can optionally be sent to an additional de-dusting step, for example of the bag filter type or other appropriate equipment, before the final purification treatment.

Said purification unit can be of the PSA (Pressure Swing Adsorption) type or of the membrane type or of the heat recovery type.

The solid recovered from the gaseous stream is deposited at the bottom of the primary separator 20.

The cyclone separator is designed for an appropriate loss of pressure and also allows the agglomeration of coal dust so as to facilitate the subsequent step of extracting the solid from the bottom thereof.

Said primary separator 20 is preferably, but not necessarily, provided with appropriate vibrators 21 in the lower part in order to avoid phenomena of dust agglomeration and obstruction of the outlet placed at the bottom of said separator.

Still optionally, the bottom of said primary separator can be provided with a system for cooling the solid with nitrogen or other medium.

The pressure inside the primary separator 20 is controlled on the crude hydrogen discharge manifold, even better after the purification of the same hydrogen at the appropriate purification unit.

The pressure in the crude hydrogen manifold is set between 10 and 20 barg, with a pressure drop with respect to the cracking reactor of 1-5 bar.

Moreover, overpressure controls with gas discharge in a torch venting network are included on the cracking reactor and before the purification unit.

Depending on the gas flows to be treated, it is possible to include a set of primary separators 20 operating in parallel.

Collection Chamber 30

The lower part of the primary separator 20, in which the solid separated from the gas accumulates, is connected to a solid carbon collection chamber 30, which is provided with a cooling system 31 which allows cooling both the solid coal and any entrains of the solid/gas mixture to a temperature between 500° C. and 600° C.

The passage of the solid from the bottom of the primary separator 10 to the collection chamber 30 occurs by gravity.

Primary Valve 60

An automatic valve, or primary valve 60, is included below the collection chamber 30, which is adapted to allow the controlled passage of coal from the collection chamber 30 towards the zone placed downstream of the valve.

The opening and closing of said valve is controlled by the PLC so that said valve opens only when there is a sufficient volume of solid carbon in the collection chamber 30; moreover, an end-of-stroke system, placed on this valve, allows the opening/closing thereof in total safety.

Intermediate Tank 40

The opening of the primary valve 60 allows putting the upstream section of the valve, consisting of the primary separator 20 and the collection chamber 30, which has a higher pressure substantially equal to that of the reactor (unless there are any pressure losses), in communication with the downstream section of the valve, consisting of the intermediate tank 40 which has a lower pressure; therefore, the movement of coal from the upstream zone towards the downstream zone occurs due to the pressure gradient which is generated.

In a preferred, but non-limiting embodiment, said intermediate tank 40 is of small volume to minimize the pressure disturbance inside the collection chamber 30 and therefore inside the primary separator 20 following the opening of the primary valve 60.

According to the invention, the intermediate transfer tank 40 is provided with a valve 41 for the connection with the medium pressure (MP) circuit and a pressure/vent control, which allows the depressurization of the tank itself after the carbon discharge from the collection chamber 30 towards the intermediate tank 40.

The MP depressurization pressure is set at about 4-8 barg so as to desorb the gas, mainly consisting of methane, at a pressure value such as to allow it to be fed to the second stage of a compressor, allowing the recycling thereof inside the reactor.

Moreover, in the preferred embodiment described, said intermediate tank 40 is provided with a coal cooling system 42 by means of nitrogen and/or other refrigerant.

Secondary Valve 70

A second automatic valve, or secondary valve 70, is provided below the intermediate tank 40 for the controlled discharge of the coal accumulated in the intermediate tank 40 towards the zone downstream of said second valve.

Storage Tank 50

The coal from the intermediate tank 40, by means of the controlled opening of the secondary valve 70, is directed towards a storage tank 50.

According to the invention, said storage tank 50 is provided with a vent valve connected to the low pressure circuit, or BP vent valve 51, a second atmospheric vent valve, or ATM vent valve 52, and a bottom valve 53 for discharging coal.

The BP vent pressure of this tank is between 0.1 and 1 barg, more preferably between 0.1 and 0.2 barg, so as to allow the desorbed gas to be mixed with the purge gas from the PSA and both be recycled to the reactor.

The final evacuation of carbon from the storage tank 50 occurs after a further depressurization to atmospheric pressure by means of the ATM vent valve 52; in this case, the gas is no longer recycled, as occurred in the previous depressurizations, but is sent to the vent.

Optionally, the final storage tank 50 can also be provided with a solid cooling system, so that the subsequent discharge can occur at a temperature close to that of the environment.

A peculiar feature of the invention is that the elements forming the separation system 1 operate according to a sequential opening mode of the valves which allows the progressive evacuation of carbon towards the storage tank 50.

In the non-limiting, preferred embodiment described, said sequential opening system comprises cyclically performing the following six steps shown in the table below, the acronyms of which are shown below:

I=cycle start (of each single step)

F=cycle end (of each step)

A=Valve open

-=Valve closed

At the end of step 6 the cycle is repeated, starting again from step 1.

In essence, the progressive opening of the valves allows a gradual lowering of the pressure from the value present inside the reactor to the atmospheric value; this involves the separation of the carbon from the gaseous matrix transporting it outside the reactor, and also allows operating a desorption of the gases possibly retained by the same carbon.

| FIG. | 3A | | 3B | | 3C | | 3D | | 3E | | 3F | |
|---|---|---|---|---|---|---|---|---|---|---|---|---|
| Step | | | | | | | | | | | | |
| | 1 | | 2 | | 3 | | 4 | | 5 | | 6 | |
| Start/End | | | | | | | | | | | | |
| | I | F | I | F | I | F | I | F | I | F | I | F |
| Primary valve (60) | A | — | — | — | — | — | — | — | — | — | — | — |
| MP Vent valve (41) | — | — | A | — | — | — | A | — | — | — | — | — |
| Secondary valve (70) | — | — | — | — | A | — | — | — | — | — | — | — |
| BP Vent valve (51) | — | — | — | — | — | — | A | — | — | — | — | — |
| ATM Vent valve (52) | — | — | — | — | — | — | — | — | A | — | — | — |
| Bottom valve (53) | — | — | — | — | — | — | — | — | — | — | A | — |

As indicated, each step includes a cycle start, marked by the opening of one or more appropriate valves, and a cycle end, marked by the closing of all the valves; in particular, each end-of-cycle step determines a rest time with all the valves closed at the end of each step, said rest time allowing an equalization of the pressures inside the equipment present upstream and downstream of the valves.

Detailed Description of the Individual Purification Steps

Step 1

At the beginning of step 1, the primary valve 60 placed between the collection chamber 30 and the intermediate transfer tank 40 is opened; under this condition, the secondary valve 70, placed between the intermediate transfer tank 40 and the storage tank 50, is closed.

In the primary separator 20, the coal entrained by the gas is separated by gravity from the gaseous matrix which drags it and is deposited in the collection chamber 30; moreover, the opening of the primary valve 60 involves the generation of a pressure gradient between the primary separator 20 and the intermediate tank 40 which promotes a further separation between the solid and the gas.

At the end of step 1, the primary valve 60 closes, with the intermediate tank 40 being at the same pressure as the primary separator 20.

Under this condition, there is no pressure difference between the primary separator 20 and the intermediate tank 40; assuming to have multiple primary separators 10, the control logic will define the sequence of openings/closings of the primary 60 and secondary 70 valves.

Therefore, at the end of step 1, the intermediate tank 40 charged with coal is practically insulated, having also closed the MP vent valve 41.

Step 2

The start of step 2 includes opening the MP vent valve 41 of the intermediate tank 40.

The intermediate tank 40 is thus brought to the same pressure as the medium pressure line.

In the non-limiting, preferred embodiment described, said medium pressure is between 4 and 8 barg.

The coal thus desorbs a part of the previously retained gas which, therefore, exits from the intermediate tank 40 as a result of the pressure decrease.

At the end of step 2, i.e., after the depressurization is achieved, the MP vent valve 41 is closed.

Optionally, the intermediate tank 40 is provided with a cooling system 42 adapted to lower the temperature of the solid to a value close to that of the environment.

Step 3

The start of step 3 includes opening the secondary valve 70 placed between the intermediate tank 40 and the storage tank 50.

The pressure difference between the two tanks allows the transfer of the solid from the intermediate tank 40, which is at medium pressure, to the storage tank 50, which is at low pressure.

Step 3 ends with the closing of the secondary valve 70; the intermediate tank 40 is thus insulated again, but it is empty as the coal has been transferred to the final storage tank 50.

Step 4

Step 4 includes opening both the MP vent valve 41, which returns the intermediate tank 40 to medium pressure, and opening the BP vent valve 51 placed on the storage tank 50.

In particular, the opening of the BP vent valve 51 allows the same pressure value of the low pressure line to be reached.

In the non-limiting, preferred embodiment described, said low pressure value is between 0.2 and 0.1 barg.

The coal thus desorbs all the gas possibly still retained, which then exits from the storage tank 50 due to the pressure difference.

Step 5

The start of step 5 includes opening the ATM vent valve 52 to allow a further desorption of any gases still retained in the coal.

The gases thus desorbed are no longer recycled, as occurred in the preceding steps, but are sent to vent.

The tank 50 is thus brought to atmospheric pressure.

Step 6

Step 6 includes opening the bottom valve 53 for discharging the coal to the outside until the storage tank 50 is emptied.

At the end of this step, all the valves are closed and the cycle is repeated starting from step 1.

Advantageously, the solution described allows continuously separating the reaction products from the melting bath and removing them from the inside of the reactor, also allowing the separation between the gas and coal obtained from the cracking reaction to be equalized.

In fact, while the discharge of the stream consisting of gas and solid occurs continuously, like the operation of the reactor, the separation of the solid coal from the gas occurs discontinuously, utilizing both the flow of the gas as a main motor carrier for transporting, and thus removing, the solid from the reactor towards the separation system, and the pressure gradient existing between the reactor R and the removal system 1 for the desorption of the gases retained by the solid itself.

Therefore, the discontinuous discharge of coal occurs in several steps, each of which is discontinuous: every single operational discontinuity is harmonized in a continuous process through the sequential opening of the valves: the equipment placed upstream of each valve thus acts as a buffer for the equipment placed downstream of the same valve, precisely harmonizing the entire separation cycle.

The invention claimed is:

1. An apparatus for continuously separating, removing and purifying a solid residue, resulting from the conversion of hydrocarbons into carbon and hydrogen, from a homogeneous phase having a different density contained in a cracking reactor with which said solid residue is not soluble, said apparatus comprising:

a reactor provided with a shell on which at least one outlet nozzle is provided in order to facilitate the release of the gas/solid stream produced inside said reactor and provided with a barrier of hollow cylindrical shape, made of a refractory material, coaxial with the shell of the reactor adapted to divide the volume of said reactor into a calm annular zone and an inner reaction zone, said barrier being provided with at least one weir at the top and at least one opening at the bottom to allow the homogeneous phase having a different density to pass from the calm annular zone to the inner reaction zone;

at least one distributor placed at the bottom of the reactor for an injection of hydrocarbon into the reactor;

an impeller operable by a shaft driven by a motor placed outside the reactor; and an exit pipe connecting said reactor to a system configured to separate the solid phase from the gaseous phase, the system comprising:

at least one primary separator, at least one collection chamber downstream of the at least one primary separator, at least one intermediate transfer tank downstream of the at least one collection chamber and provided with a MP vent valve connected to a medium pressure circuit, at least one final storage tank downstream of the at least one intermediate transfer tank and provided with a BP vent valve connected to a low pressure circuit, a second atmospheric ATM vent valve connected to a vent, and a bottom valve configured to discharge solids, at least one primary valve placed between the collection chamber and the intermediate tank configured to transfer solids from said collection chamber to the intermediate tank, at least one secondary valve placed between the intermediate tank and the storage tank configured to transfer solids from the intermediate tank to the storage tank, and a control and automation system for opening the valves by a PLC.

2. The apparatus according to claim 1, wherein said homogeneous phase is a melting bath of molten metal and/or molten salt bath.

3. The apparatus according to claim 2, wherein said homogeneous phase comprises a catalyst.

4. The apparatus according to claim 2, wherein said melting bath has a lower density in the reaction zone, said lower density being induced by the bubbling of the reagents introduced into the reactor by said distributor and also by the bubbling of the reaction products, and a higher density in the annular zone, due to both the separation of the reaction products from the molten mass and also the local cooling of the melting bath due to the distance from the reaction zone.

5. The apparatus according to claim 2, wherein the transfer of the molten metal and/or molten salt from the reaction zone to the calm annular zone occurs through one or more special openings present in said barrier and is due to the difference in density between the two zones, said difference in density allowing the layering and collection of the solid carbon on the free surface of the melting bath at the calm annular zone, said solid carbon being produced by the reaction and being insoluble with the melting bath.

6. The apparatus according to claim 5, wherein the impeller allows improving the movement of the solid accumulated on the free surface from the central zone to the annular zone and to avoid accumulations of coal above the weir.

7. The apparatus according to claim 2, wherein said outlet nozzle from the reactor is angularly offset with respect to a discharge point of the weir to allow the separation of the reaction products from the melting bath during the travel.

8. The apparatus according to claim 1, wherein the shell is provided with refractory coating.

9. The apparatus according to claim 1, wherein the motor driving the shaft connected to the impeller is of the magnetic coupling type.

10. The apparatus according to claim 1, wherein said annular zone of the reactor is connected to said exit pipe configured to discharge the gas/solid stream produced inside the reactor.

11. The apparatus according to claim 10, wherein said exit pipe is made of a refractory material.

12. The apparatus according to claim 10, wherein said exit pipe is made of a metal material.

13. The apparatus according to claim 10, wherein said exit pipe is further provided with a cooling system in order to reduce the temperature of the gas/solid stream from about 1000-1200° C. about 800-900° C.

14. The apparatus according to claim 1, wherein said exit pipe is connected to said primary separator, said primary separator being a cyclone separator in which the gas/solid stream is separated and in which a crude gas, mainly consisting of crude hydrogen and methane, is released from the top of said primary separator, while the solids are layered in the lower part of said separator, said solids comprising an amount of absorbed hydrocarbon gases.

15. The apparatus according to claim 14, wherein said primary separator has a bottom provided with vibrators in order to prevent dust agglomeration and solid outlet obstruction phenomena.

16. The apparatus according to claim 14, wherein said primary separator is further provided with a cooling system.

17. The apparatus according to claim 1, wherein said primary separator has a bottom connected to the collection chamber and the collection chamber is provided with a cooling system, and wherein the passage of the solid from the bottom of the primary separator to said collection chamber occurs by gravity.

18. The apparatus according to claim 1, wherein said primary valve is an automatic primary valve, said automatic primary valve regulating the passage of the solid from upstream, at higher pressure, to downstream, at lower pressure.

19. The apparatus according to claim 18, wherein said MP vent valve is an automatic MP vent valve, said automatic MP vent valve being able to allow the depressurization of said intermediate tank and thus the desorption of the solid-retained gases.

20. The apparatus according to claim 19, wherein pressure in said medium pressure circuit is between 4-8 barg.

21. The apparatus according to claim 18, wherein said intermediate tank is provided with a coal cooling system.

22. The apparatus according to claim 1, wherein the secondary valve is an automatic secondary valve, said automatic secondary valve regulating the passage of the solids from upstream, at higher pressure, to downstream, at lower pressure.

23. The apparatus according to claim 22, wherein the low pressure circuit is configured to allow the depressurization of said storage tank and thus the desorption of solid-retained gases.

24. The apparatus according to claim 1, wherein gases desorbed by the MP vent valve and gases desorbed by the BP vent valve are recycled to the reactor after compression.

25. A method utilizing the apparatus according to claim 1, the method comprising, the following steps occurring at consecutive times:

producing the gas/solid stream comprising carbon and H₂ by cracking reaction inside the reactor;

separating the solid residue by means of insolubility of the solid residue with respect to a melting bath of the homogenous phase;

separating the gas by density difference from the solid residue to produce the solid phase;

removing the solid phase from the reactor by means of external transport due to the gaseous phase exiting the reactor; and purifying the carbon by means of gradual pressure lowering and gradual cooling.

26. The method according to claim 25, wherein movement of solid residue from a discharge point of the weir to the outlet nozzle occurs by dragging, exploiting the movement of the melting bath.

27. The method according to claim 25, wherein said purification step occurs by sequentially opening the valves including the following steps:

step 1: primary valve opening, cycle start: primary valve opening, all remaining valves closed, and cycle end: all valves closing;

step 2:

cycle start: MP vent valve opening, all remaining valves closed, and

cycle end: all valves closing;

step 3:

cycle start: secondary valve opening, all remaining valves closed, and cycle end: all valves closing;

step 4:

cycle start: MP vent valve and BP vent valve opening, all remaining valves closed, and cycle end: all valves closing;

step 5:

cycle start: ATM vent valve opening, all remaining valves closed, and cycle end: all valve closing;

step 6:

cycle start: bottom valve opening, all remaining valves closed;

cycle end: all valves closing; and wherein at the end of step 6 the entire sequence starts again from step 1.

28. The method according to claim 25, wherein the pressure of said low pressure circuit is between 0.1-1 barg.

29. The method according to claim 25, wherein crude gas outcoming from the primary separator is sent to a purification unit which allows the separation between the produced hydrogen from any recyclable gaseous hydrocarbon components inside the reactor after compression.

30. The method according to claim 29, wherein the crude gas incoming to the purification unit is pre-treated in a further separation step aimed to the elimination of any solid particles still present in the gaseous phase.

\* \* \* \* \*